C. ANDRADE, Jr.
WINDLASS.
APPLICATION FILED MAY 4, 1910.

972,982.

Patented Oct. 18, 1910.

5 SHEETS—SHEET 1.

WITNESSES:
David J. Walsh
Irving Klein

INVENTOR
Cipriano Andrade Jr.

C. ANDRADE, Jr.
WINDLASS.
APPLICATION FILED MAY 4, 1910.
972,982.
Patented Oct. 18, 1910.
5 SHEETS—SHEET 2.
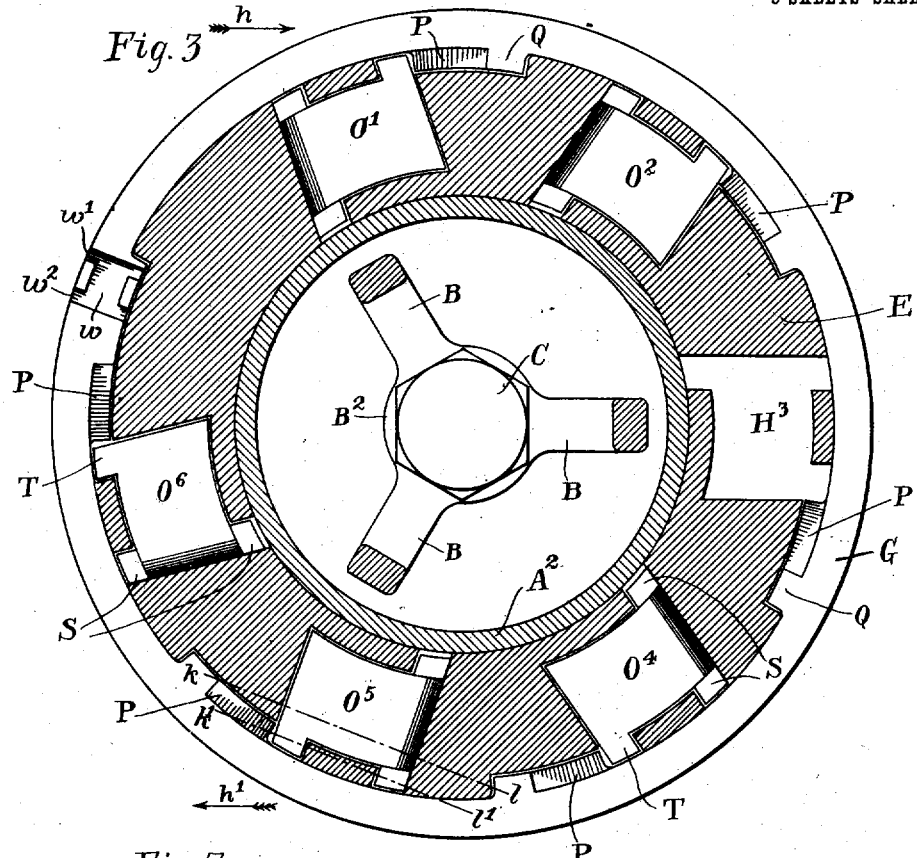
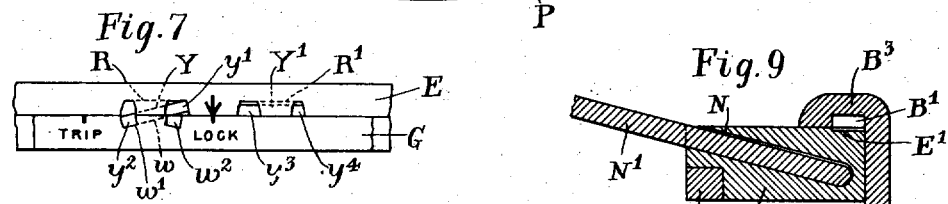
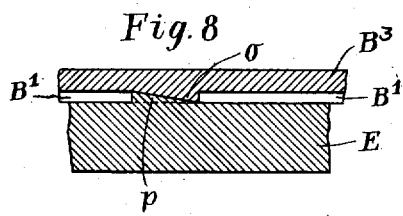
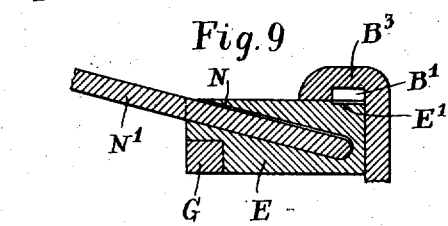
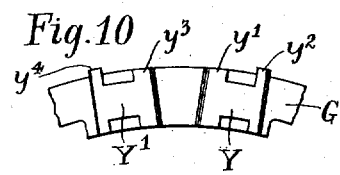
WITNESSES:
David J. Walsh
Irving Klein
INVENTOR
Cipriano Andrade Jr C. ANDRADE, Jr.
WINDLASS.
APPLICATION FILED MAY 4, 1910.

972,982.

Patented Oct. 18, 1910.
5 SHEETS—SHEET 3.

WITNESSES:
David J. Walsh
Irving Klein

INVENTOR
Cipriano Andrade Jr.

C. ANDRADE, Jr.
WINDLASS.
APPLICATION FILED MAY 4, 1910.

972,982.

Patented Oct. 18, 1910.
5 SHEETS—SHEET 4.

WITNESSES:
David J. Walsh
Irving Klein

INVENTOR
Cipriano Andrade Jr.

C. ANDRADE, Jr.
WINDLASS.
APPLICATION FILED MAY 4, 1910.
972,982.
Patented Oct. 18, 1910.
5 SHEETS—SHEET 5.
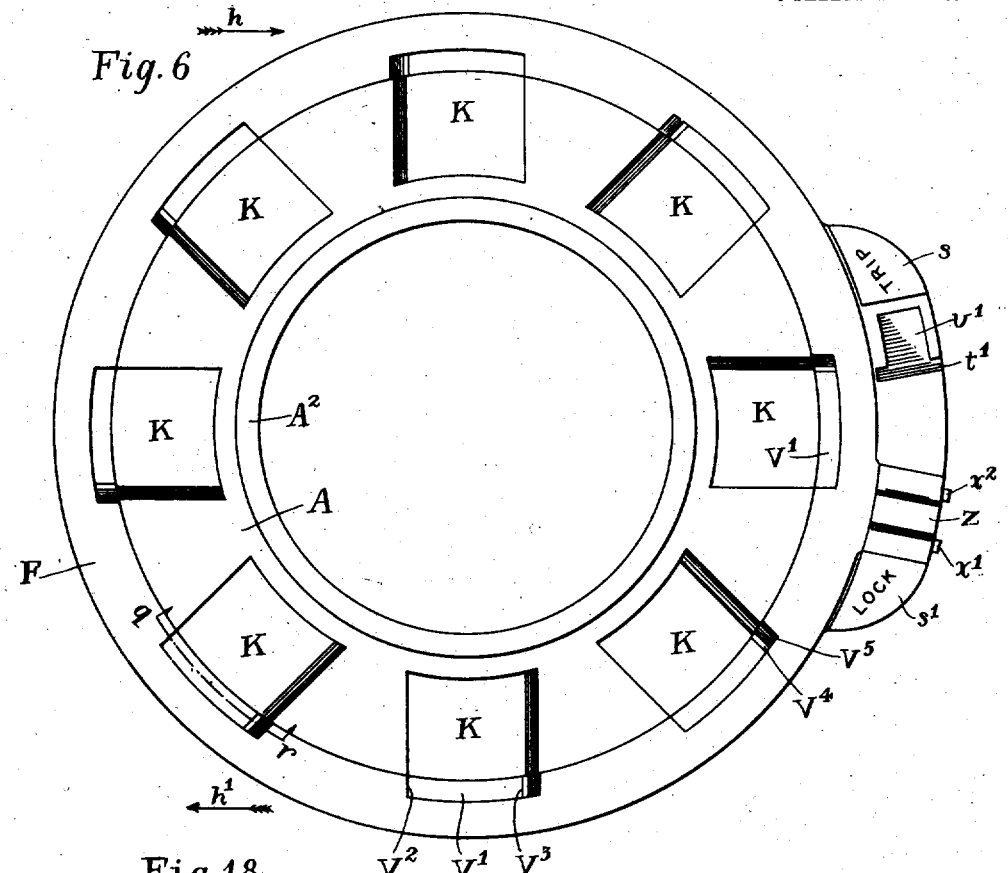
Fig. 6
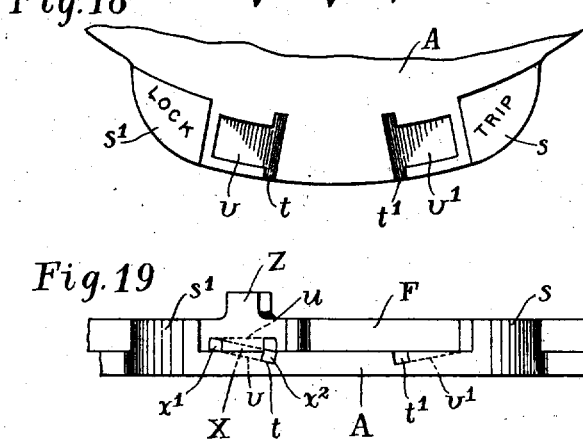
Fig. 18
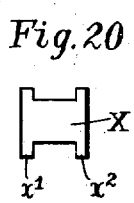
Fig. 20
Fig. 19
WITNESSES:
David J. Walsh
Irving Klein
INVENTOR
Cipriano Andrade Jr.

UNITED STATES PATENT OFFICE.

CIPRIANO ANDRADE, JR., OF NEW YORK, N. Y.

WINDLASS.

972,982.  Specification of Letters Patent.  Patented Oct. 18, 1910.

Application filed May 4, 1910. Serial No. 559,384.

*To all whom it may concern:*

Be it known that I, CIPRIANO ANDRADE, Jr., a citizen of the United States, residing at 328 West Eighty-fourth street, in the city of New York, in the county of New York and State of New York, have invented a new and useful Windlass, of which the following is a specification.

Figure 1:
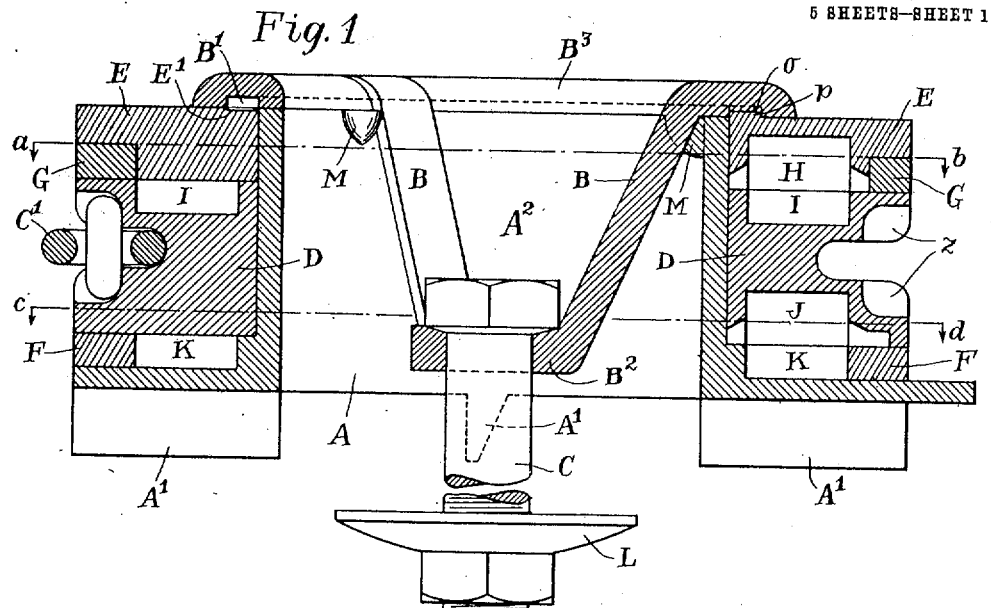
Figure 2:
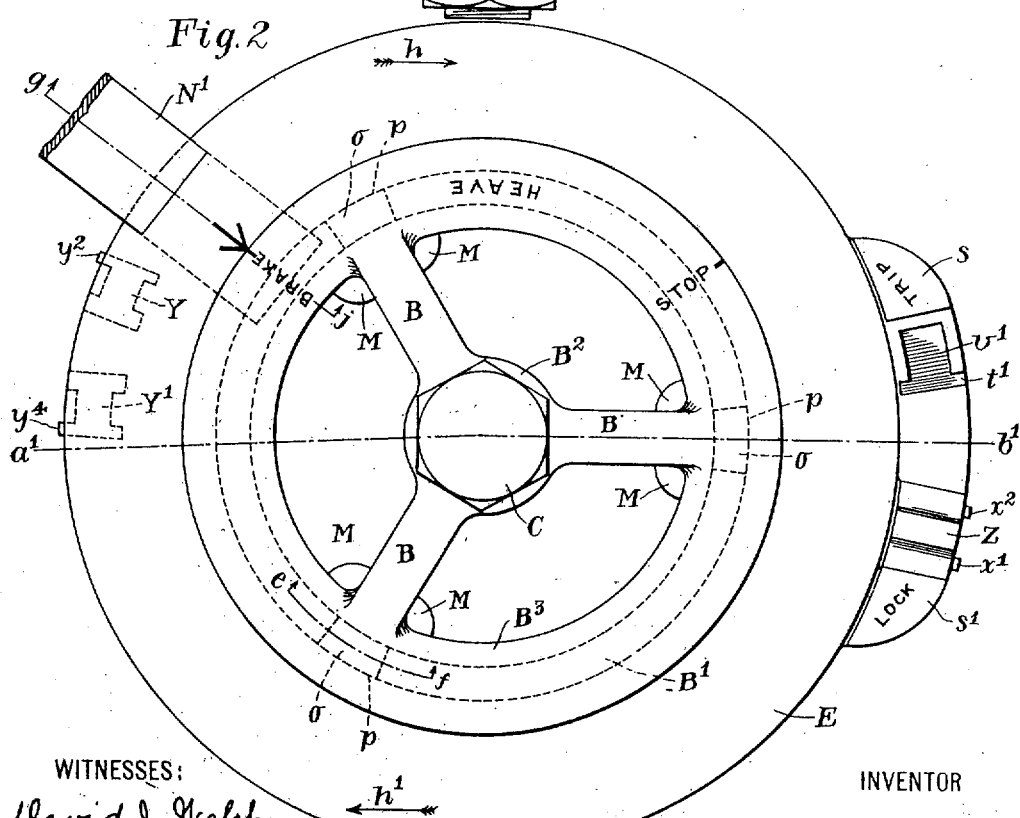
Figure 4:
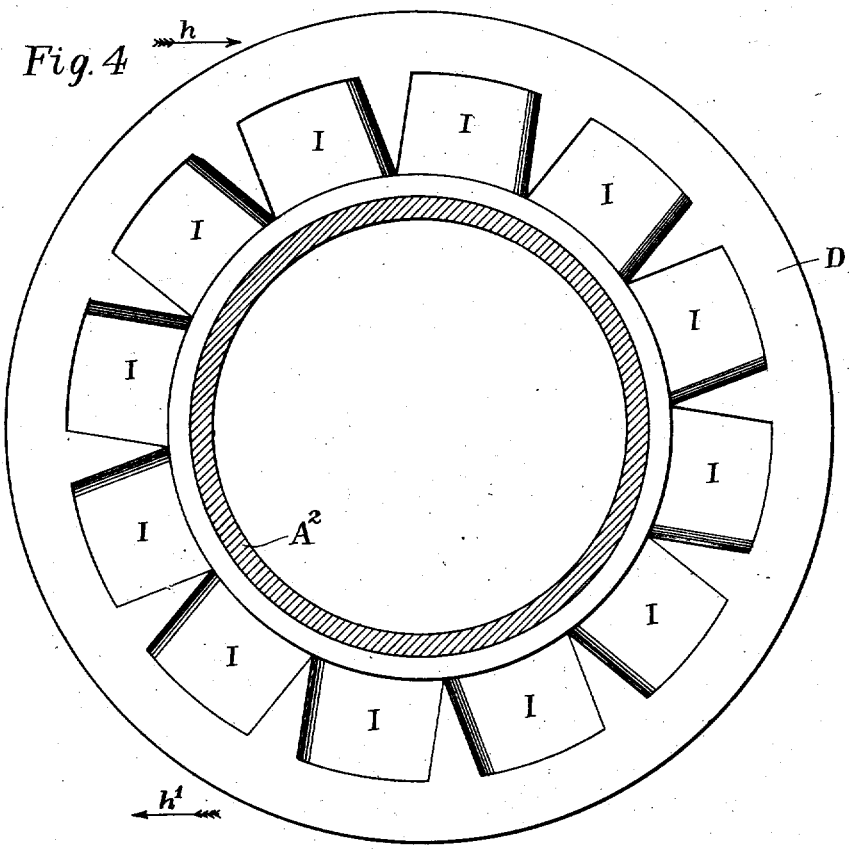
Figure 11:
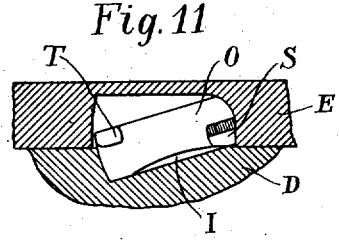
Figure 13:
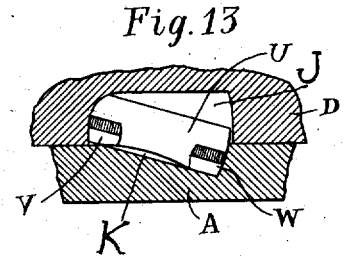
Figure 12:
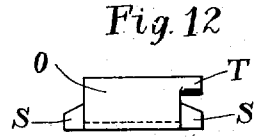
Figure 14:
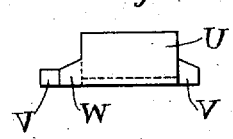
Figure 5:
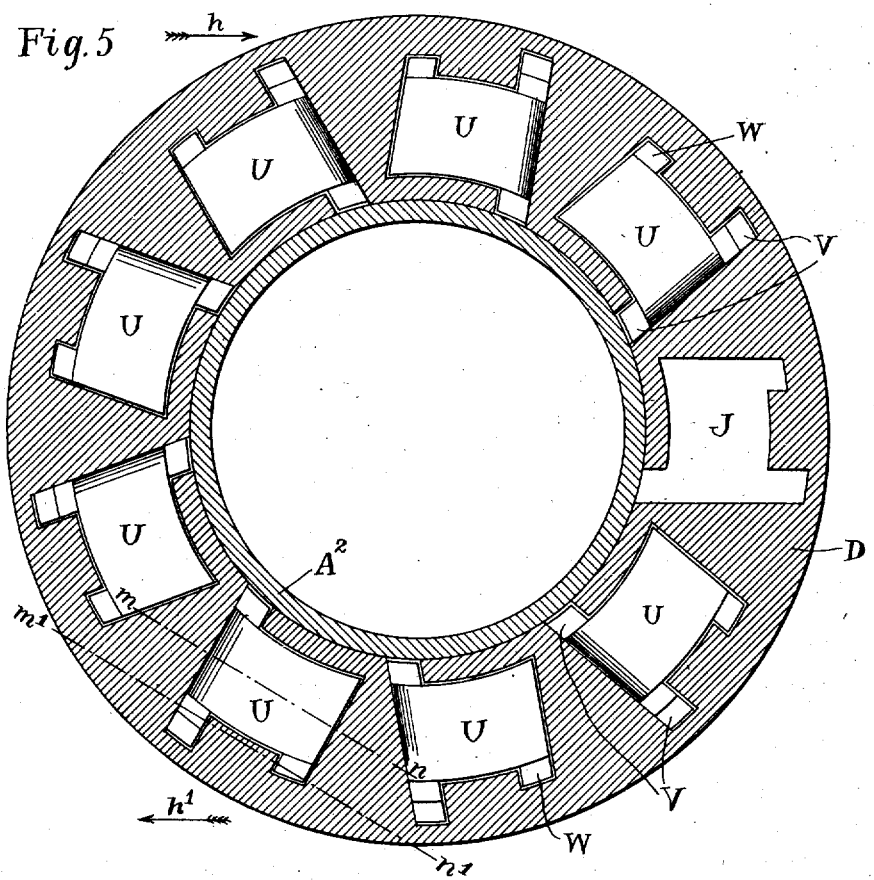
Figure 15:
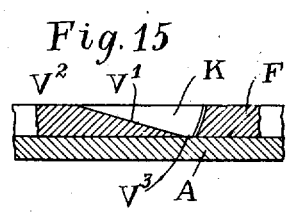
Figure 16:
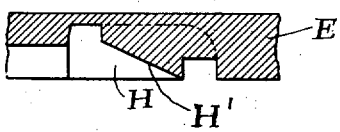
Figure 17:
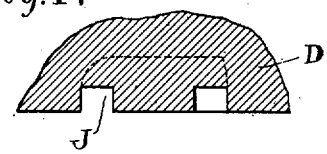

My invention relates to improvements in windlasses; and the objects of my invention are; first to provide a form of windlass which shall occupy less space than the devices heretofore used for similar work; second, to provide a form of windlass which shall weigh less than the devices heretofore used for similar work; third, to provide a form of windlass which shall be cheaper and simpler to manufacture than the devices heretofore used for similar work; fourth, to provide a form of windlass which cannot be fouled by ropes or other articles on a vessel's deck or elsewhere; fifth, to provide a form of windlass that can be braked without the use of a brake band. I attain these objects by the mechanism illustrated in the accompanying drawings, in which:

Figure 1 is a section in elevation of my device taken on the line $a'$—$b'$ (Fig. 2). Fig. 2 is a plan view of the top of my device. Fig. 3 is a horizontal section of my device taken on the line $a$—$b$ (Fig. 1). Fig. 4 is a plan view on the level of the top of the sheave. Fig. 5 is a horizontal section of my device taken on the line $c$—$d$ (Fig. 1). Fig. 6 is a plan view of the bed plate. Fig. 7 is a detail elevation of the locking device for the upper trip ring. Fig. 8 is a section elevation looking toward the center of the windlass taken on the line $e$—$f$ (Fig. 2). Fig. 9 is a section elevation taken on line $g$—$j$ (Fig. 2). Fig. 10 is a plan view of the locking device for the upper trip ring. Fig. 11 is a section elevation, looking toward the center of the windlass, in plane $k$—$l$ (Fig. 3) showing an upper pawl in relief. Fig. 12 is an end view of an upper pawl. Fig. 13 is a section elevation, looking toward the center of the windlass, in plane $m$—$n$ (Fig. 5) showing a lower pawl in relief. Fig. 14 is an end view of a lower pawl. Fig. 15 is a section elevation, looking toward the center of the windlass, in plane $q$—$r$ (Fig. 6). Fig. 16 is a section elevation, looking toward the center of the windlass, in plane $k'$—$l'$ (Fig. 3), the pawl being removed. Fig. 17 is a section elevation, looking toward the center of the windlass, in plane $m'$—$n'$ (Fig. 5). Fig. 18 is a detail plan view of a portion of the bedplate showing locking device for lower trip ring. Fig. 19 is a detail elevation of the locking device for the lower trip ring. Fig. 20 is a detail plan view of the locking pawl for the lower trip ring.

Similar letters refer to similar parts throughout the several views.

A is a bed plate.

A' are lugs on the bottom of bed plate A. These lugs A' are countersunk into the deck or floor and prevent the bed plate from moving.

$A^2$ is a central hollow pin integral with bed plate A.

B $B^2$ $B^3$ is a spider, comprising a central ring $B^2$, three arms B, and an upper ring $B^3$.

B' is a circular groove in the lower face of ring $B^3$.

C is a central bolt which passes through the hole in central ring $B^2$.

L is a nut threaded to the lower end of bolt C.

C' is a section of chain in place on the periphery of the windlass.

D is a sheave rotating about $A^2$ as an axis.

E is a top plate rotating about the upper portion of $A^2$ as an axis.

E' is a circular shallow clearance groove in the top of top plate E, groove E' registers with groove B'.

F is the lower trip ring.

G is the upper trip ring.

H are recesses in top plate E, made to receive upper pawls O.

H' are inclined faces in top plate E over the path of travel of wedges P.

I are recesses in top of sheave D to engage the free ends of pawls O.

J are recesses in sheave D to receive lower pawls U.

K are recesses in bed plate A to engage the free ends of pawls U.

$o$ are wedges depending from the upper face of groove B' and integral with ring $B^3$.

$p$ are wedges located in groove E' and integral with top plate E.

M are lugs integral with hollow pin $A^2$, their function being to hold the spider arms B in place.

N' is a removable handle bar in position in socket N in top plate E.

Y is a lock pawl to lock trip ring G in position.

$y'$ is a trunnion on lock pawl Y.

$y^2$ is a projecting trunnion on lock pawl Y. Y' is another lock pawl to lock trip ring G in position.

$y^3$ is a trunnion on lock pawl Y'.

$y^4$ is a projecting trunnion on lock pawl Y'.

$s$ is a stop lug integral with bed plate A.

$s'$ is another stop lug integral with bed plate A.

Z is a handle integral with trip ring F.

$v$ and $v'$ are recesses in bed plate A.

$t$ is a slot extending from recess $v$.

$t'$ is a slot extending from recess $v'$.

X is a locking pawl to lock handle Z in position.

$x'$ and $x^2$ are lugs projecting from pawl X.

$O'$, $O^2$, $O^4$, $O^5$ and $O^6$ are upper pawls. $O^3$ is not shown, but in its place there is shown its recess $H^3$ (Fig. 3).

P are wedges integral with trip ring G.

Q are lugs integral with wedges P and trip ring G. Wedges P have their upper edge level with the top of lug Q and trip ring G. Wedges P have their lower edge next to lugs T (Fig. 3).

S are trunnions on pawls O.

T are trip lugs at the following end of pawls O.

$w$ is a locking recess on top of trip ring G, with grooves $w'$ and $w^2$.

V are trunnions on pawls U.

W are trip lugs on pawls U.

V' are wedges integral with trip ring F.

$V^2$ are the upper edges of wedges V', which are flush with the top of trip ring F.

$V^3$ are the lower edges of wedges V', which are flush with the bottom of trip ring F. $V^3$ is also flush with the lower edge of recesses K.

$V^4$ are open spaces in bottom of trip ring F.

$V^5$ are inclined surfaces in trip ring F, running parallel with the adjoining surfaces in recesses K. In the locking position of trip ring F, surfaces $V^5$ should be back about 1/32 of an inch or thereabout from the adjoining surface in recess K, in order to keep the thrust of pawls U entirely on bed plate A, and not to have any portion of that thrust on trip ring F.

$u$ is a recess in the lower face of handle Z. Recess $u$ is so shaped as to fit around lock pawl X.

$z$ are whelps on the periphery of sheave D.

It will be understood that where my device is used for rope, the whelps will be omitted, and the periphery of the sheave D will be finished as a smooth or grooved drum as is the common practice at the present time.

The operation of my device is as follows: The upper trip ring is set in the "lock" position (Fig. 7), and the lower trip ring is set in the "lock" position (Fig. 19). A chain is led from the direction $h$ (Fig. 2) around the edge of sheave D, and away in the direction $h'$, the links of the chain being placed between whelps $z$. By reference to Fig. 2 it will be observed that the word "Brake" apears on top of ring $B^3$, and the arrow on top of top plate E points to this word "Brake" on ring $B^3$. By means of handle bar N', top plate E is made to rotate say about 100 degrees in the direction $h$ (the arrow on top plate E passing by the word "Heave" shown on top of ring $B^3$) until the arrow on top plate E nearly reaches the word "Stop" on ring $B^3$; during this operation one of the pawls O, engaging in one of the recesses I, carries the sheave D in the same direction as top plate E, and a length of chain is thus drawn in from the direction $h$ and discharged in the direction $h'$. A light tension is, of course, to be maintained on the chain when it leaves D in the direction $h'$. This tension may be by hand pull, or by leading the chain down a pipe through the deck of the vessel as is commonly the practice with anchor chains, etc., in which case the weight of the chain going down through the pipe keeps the proper tension on the chain. At the end of the 100 degrees of rotation just mentioned, the handle bar N' carrying with it top plate E is rotated backward against the direction $h$ say 90 degrees to a point near the original starting point (marked "Brake"). During the backward motion of top plate E, the sheave D is held motionless by one of the pawls U engaging in one of the recesses K in bed plate A; at the same time the pawls O in top plate E slide back over recesses I in the top of sheave D. Thus by successive reciprocating movements of handle bar N', sheave D is rotated steadily in the direction $h$ $h'$, and any desired length of chain may be drawn in from the direction $h$ and discharged in the direction $h'$. And whenever handle bar N' is withdrawn from socket N, the sheave D (and with it the chain) is held fast by a pawl U engaging in a recess K. Suppose now, that it is desired to hold the chain fast. We turn top plate E back against the direction $h$ until it assumes the position shown in Fig. 2, at which point the lower face of wedges $o$ comes in contact with the upper face of wedges $p$, thus jamming top plate E down on sheave D. In this position, sheave D is held fast by the friction of its upper and lower faces against top plate E and bed plate A. As sheave D is held fast, so, of course, is the chain. While sheave D is thus held by friction between top plate E and bed plate A, it should be noted that trip rings F and G should not be jammed, but should be free to rotate so far as any pressure exerted by top plate E is concerned.

This is accomplished by suitable machining of the trip rings F and G and the adjoining parts of the device. Suppose now, that it is desired to pay out the chain. Top plate E is left jammed down against sheave D; and the next operation is to trip both the upper and the lower set of pawls. This is accomplished as follows: To trip the upper pawls—lift the lug $y^2$ on lock pawl Y (Figs. 2 and 7) and rotate trip ring G to the right until the arrow on top plate E (Fig. 7) points to the line over the word "Trip" engraved on trip ring G (Fig. 7). At this point the lug $y^4$ on lock pawl Y' will fall into groove $w^2$, thus locking trip ring G, and preventing trip ring G from rotating back to the left. Also in this position, further motion of trip ring G to the right is prevented by contact of the upper surface of wedges P with the lower surface of wedges H'. (Fig. 16.) While trip ring G has been rotating from left to right wedges P (Fig. 3) have been entering under trip lugs T, and by the time that trip ring G has reached the full tripping position, trip lugs T are resting on top of lugs Q (Fig. 3). By this means, all the pawls O in top plate E are securely and permanently tripped. To trip the lower pawls: lift lug $x^2$ on lock pawl X out of groove $t$ (Fig. 19). Push handle Z to the right until it comes in contact with lug $s$. In this position, lug $x'$ falls into groove $t'$, thus locking trip ring F securely in position. While handle Z on trip ring F has been rotating from the left to the right, the wedges V' have been lifting trip lugs W on pawls U. And when handle Z is locked in position next to lug $s$, the wedges V' in trip ring F all register with the flat surfaces on top of bed plate A between recesses K (Fig. 6). By this means all the pawls U in sheave D are securely and permanently tripped. Sheave D is now held merely by friction caused by the pressure of top plate E, and in order to pay out the chain, all that is necessary is to relieve the pressure of top plate E by moving handle N' in the direction $h$ $h'$. This causes top plate E also to rotate in the direction $h$ $h'$, and thus to take the wedges $o$ and $p$ out of engagement, and to lessen the friction on sheave D, whereupon sheave D is free to rotate, and the chain pays out. The outward movement of the chain can be controlled, checked or completely stopped, by decreasing or increasing the friction between top plate E and sheave D, by moving or pressing handle bar N' in one direction or the other.

It will of course be understood that I do not limit myself to a handle bar operated by manual power; but any steam, electric or other power means may be employed to impart a limited reciprocating motion of rotation to top plate E.

There are certain improvements in pawl and ratchet mechanisms, shown and described in this specification and the drawings accompanying the same, and originally claimed by me in this specification, which I have been required by the Patent Office to divide, and I am making a divisional application, Serial Number 568,582 to cover such pawl and ratchet mechanism. There are certain improvements in machine brake mechanisms, shown and described in the specification and the drawings accompanying the same, and originally claimed by me in this application, which I have been required to divide, and I am making a divisional application, Serial Number 569,952, to cover such machine brake mechanism.

I claim:

1. In windlasses, in combination; a bed plate, having recesses in its upper face; a central pin perpendicular to said bed plate and integral therewith; a sheave rotating freely about said pin as an axis, the lower face of said sheave resting on the upper face of said bed plate, said sheave having recesses in its top face; a top plate rotating freely about said pin as an axis, the lower face of said top plate resting on the upper face of said sheave, said top plate having wedges on its upper face; a covering member above the upper face of said top plate, said covering member being fixed with reference to the pin, said covering member having on its lower face wedges, each of said wedges registering in the path of travel of the corresponding wedge on the top plate, and coöperating with its corresponding wedge on the top plate to force the top plate away from the covering member and down on the sheave when the two wedges are brought into rotary contact, the covering member also having a portion of its lower face in continuous bearing contact with the upper face of the top plate; pawls let into the lower face of said top plate, said pawls engaging in said recesses in the upper face of said sheave, whereby said sheave is free to rotate in one direction with reference to said top plate, but not in the opposite direction; pawls let into the lower face of said sheave, said pawls engaging said recesses in the upper face of said bed plate, and coöperating with said pawls in the lower face of said top plate, whereby said sheave is free to rotate in one direction with reference to said bed plate and top plate, but not in the opposite direction; means for imparting a limited reciprocating motion of rotation to said top plate; means for securing said windlass solidly to the deck or floor; means for tripping said pawls in the bottom of said top plate; means for tripping said pawls in the bottom of said sheave.

2. In windlasses, in combination; a bed plate, having recesses in its upper face; a central pin perpendicular to said bed plate and integral therewith; a sheave rotating freely about said pin as an axis, the lower face of said sheave resting on the upper face of said bed plate, said sheave having recesses on its top face; a top plate rotating freely about said pin as an axis, the lower face of said top plate resting on the upper face of said sheave, said top plate having wedges on its upper face; a covering member above the upper face of said top plate, said covering member being fixed with reference to the pin, said covering member having on its lower face wedges, each of said wedges registering in the path of travel of the corresponding wedge on the top plate, and coöperating with its corresponding wedge on the top plate to force the top plate away from the covering member and down on the sheave when the two wedges are brought into rotary contact; pawls let into the lower face of said top plate, said pawls engaging in said recesses in the upper face of said sheave, whereby said sheave is free to rotate in one direction with reference to said top plate, but not in the opposite direction; pawls let into the lower face of said sheave, said pawls engaging in said recesses in the upper face of said bed plate, and coöperating with said pawls in the lower face of said top plate, whereby said sheave is free to rotate in one direction with reference to said bed plate and top plate, but not in the opposite direction; means for imparting a limited reciprocating motion of rotation to said top plate; means for securing said windlass solidly to the deck or floor; means for tripping said pawls in the bottom of said top plate; means for tripping said pawls in the bottom of said sheave.

3. In windlasses, in combination; a bed plate, having recesses in its upper face; a central pin perpendicular to said bed plate and integral therewith; a sheave rotating freely about said pin as an axis, the lower face of said sheave resting on the upper face of said bed plate, said sheave having recesses on its top face; a top plate rotating freely about said pin as an axis, the lower face of said top plate resting on the upper face of said sheave, said top plate having a wedge on its upper face; a covering member above the upper face of said top plate, said covering member being fixed with reference to the pin, said covering member having on its lower face a wedge, registering in the path of travel of the wedge on the top plate, and coöperating with said wedge on the top plate to force the top plate away from the covering member and down on the sheave when the two wedges are brought into rotary contact, the covering member also having a portion of its lower face in continuous bearing contact with the upper face of the top plate; a pawl let into the lower face of said top plate, said pawl engaging in said recesses in the upper face of said sheave, whereby said sheave is free to rotate in one direction with reference to said top plate, but not in the opposite direction; a pawl let into the lower face of said sheave, said pawl engaging in said recesses in the upper face of said bed plate, and coöperating with said pawl in the lower face of said top plate, whereby said sheave is free to rotate in one direction with reference to said bed plate and top plate, but not in the opposite direction; means for imparting a limited reciprocating motion of rotation to said top plate; means for securing said windlass solidly to the deck or floor; means for tripping said pawl in the bottom of said top plate; means for tripping said pawl in the bottom of said sheave.

4. In windlasses, in combination; a bed plate, having recesses in its upper face; a central pin perpendicular to said bed plate and integral therewith; a sheave rotating freely about said pin as an axis, the lower face of said sheave resting on the upper face of said bed plate, said sheave having recesses on its top face; a top plate rotating freely about said pin as an axis, the lower face of said top plate resting on the upper face of said sheave, said top plate having a wedge on its upper face; a covering member above the upper face of said top plate, said covering member being fixed with reference to the pin, said covering member having on its lower face a wedge, registering in the path of travel of the wedge on the top plate, and coöperating with said wedge on the top plate to force the top plate away from the covering member and down on the sheave when the two wedges are brought into rotary contact; a pawl let into the lower face of said top plate, said pawl engaging in said recesses in the upper face of said sheave, whereby said sheave is free to rotate in one direction with reference to said top plate, but not in the opposite direction; a pawl let into the lower face of said sheave, said pawl engaging in said recesses in the upper face of said bed plate, and coöperating with said pawl in the lower face of said top plate, whereby said sheave is free to rotate in one direction with reference to said bed plate and top plate, but not in the opposite direction; means for imparting a limited reciprocating motion of rotation to said top plate; means for securing said windlass solidly to the deck or floor; means for tripping said pawl in the bottom of said top plate; means for tripping said pawl in the bottom of said sheave.

CIPRIANO ANDRADE, Jr.

Witnesses:
ADOLPH WIDDER,
ARTHUR C. JOHNSON.